Patented Mar. 19, 1940

2,194,077

UNITED STATES PATENT OFFICE 2,194,077

TERPENYL CYANAMIDES

Richard O. Roblin, Jr., Stamford, Conn., assignor to American Cyanamid Company, New York, N. Y., a corporation of Maine No Drawing. Application May 23, 1939,
Serial No. 275,222

7 Claims. (Cl. 260—551)

This invention relates to new disubstituted cyanamide compounds of the formula—

where R represents a terpenyl radical and R' represents a radical chosen from the group consisting of alkyl, aryl and aralkyl radicals.

These compounds may be generally prepared in an inert solvent such as benzene or petroleum ether fractions, by the reaction between the corresponding secondary amine and cyanogen chloride. A preferred equation for this reaction is as follows:

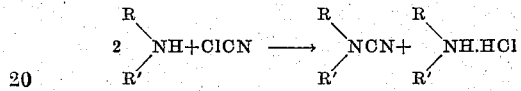

Example I 6.1 grams of cyanogen chloride are dissolved in 150 cc. of heptane. After cooling the solution to 0°–5° C., 36.2 grams of bornyl ethyl amine are gradually added with stirring. When this addition is completed, the bornyl ethyl amine hydrochloride is filtered off and washed with heptane. The washings and filtrate are united. The heptane is removed by distillation under reduced pressure. The residue is vacuum distilled and the product identified as bornyl ethyl cyanamide.

Example II 6.1 grams of cyanogen chloride are dissolved in 150 cc. of heptane. After cooling the solution to 0°–5° C., 33.4 grams of fenchyl methyl amine are gradually added with stirring. When this addition is completed, the fenchyl methyl amine hydrochloride is filtered off and washed with heptane. The washings and filtrate are united. The heptane is removed by distillation under reduced pressure. The residue is vacuum distilled and the product identified as fenchyl methyl cyanamide.

Example III 6.1 grams of cyanogen chloride are dissolved in 200 cc. of benzene. After cooling the solution to 0°–5° C., 45.8 grams of bornyl phenyl amine are gradually added with stirring. When this addition is completed, the bornyl phenyl amine hydrochloride is filtered off and washed with benzene. The washings and filtrate are united. The benzene is removed by distillation under reduced pressure. The residue is vacuum distilled and the product identified as bornyl phenyl cyanamide.

Example IV 6.1 grams of cyanogen chloride are dissolved in 200 cc. of benzene. After cooling the solution to 0°–5° C., 45.8 grams of fenchyl phenyl amine are gradually added with stirring. When this addition is completed, the fenchyl phenyl amine hydrochloride is filtered off and washed with benzene. The washings and filtrate are united. The benzene is removed by distillation under reduced pressure. The residue is vacuum distilled and the product identified as fenchyl phenyl cyanamide.

Example V 6.1 grams of cyanogen chloride are dissolved in 200 cc. of heptane. After cooling the solution to 0°–5° C., 48.6 grams of fenchyl benzyl amine are gradually added with stirring. When this addition is completed, the fenchyl benzyl amine hydrochloride is filtered off and washed with heptane. The washings and filtrate are united. The heptane is removed by distillation under reduced pressure. The residue is vacuum distilled and the product identified as fenchyl benzyl cyanamide.

Similarly other disubstituted cyanamides of the above classes may be prepared utilizing the corresponding secondary amine.

It is to be understood that the above examples are illustrative only.

These new compounds are adapted for various uses, more particularly as intermediates, insecticides and plasticizers for natural and synthetic resins.

While the invention has been described with particular reference to specific embodiments, it is to be understood that it is not be limited thereto but is to be construed broadly and restricted solely by the scope of the appended claims.

I claim:

1. As a new compound, a disubstituted cyanamide of the formula—

where R represents a terpenyl radical and R' represents a radical chosen from the group consisting of alkyl, aryl and aralkyl radicals.

2. As a new compound, a disubstituted cyanamide of the formula—

where R represents a terpenyl radical and R' represents an alkyl radical.

3. As a new compound, a disubstituted cyanamide of the formula—

where R represents a terpenyl radical and R' represents an aryl radical.

4. As a new compound, a disubstituted cyanamide of the formula—

where R represents a terpenyl radical and R' represents an aralkyl radical.

5. As a new compound, bornyl ethyl cyanamide.

6. As a new compound, borny phenyl cyanamide.

7. As a new compound, fenchyl benzyl cyanamide.

RICHARD O. ROBLIN, Jr.